Figure 1:
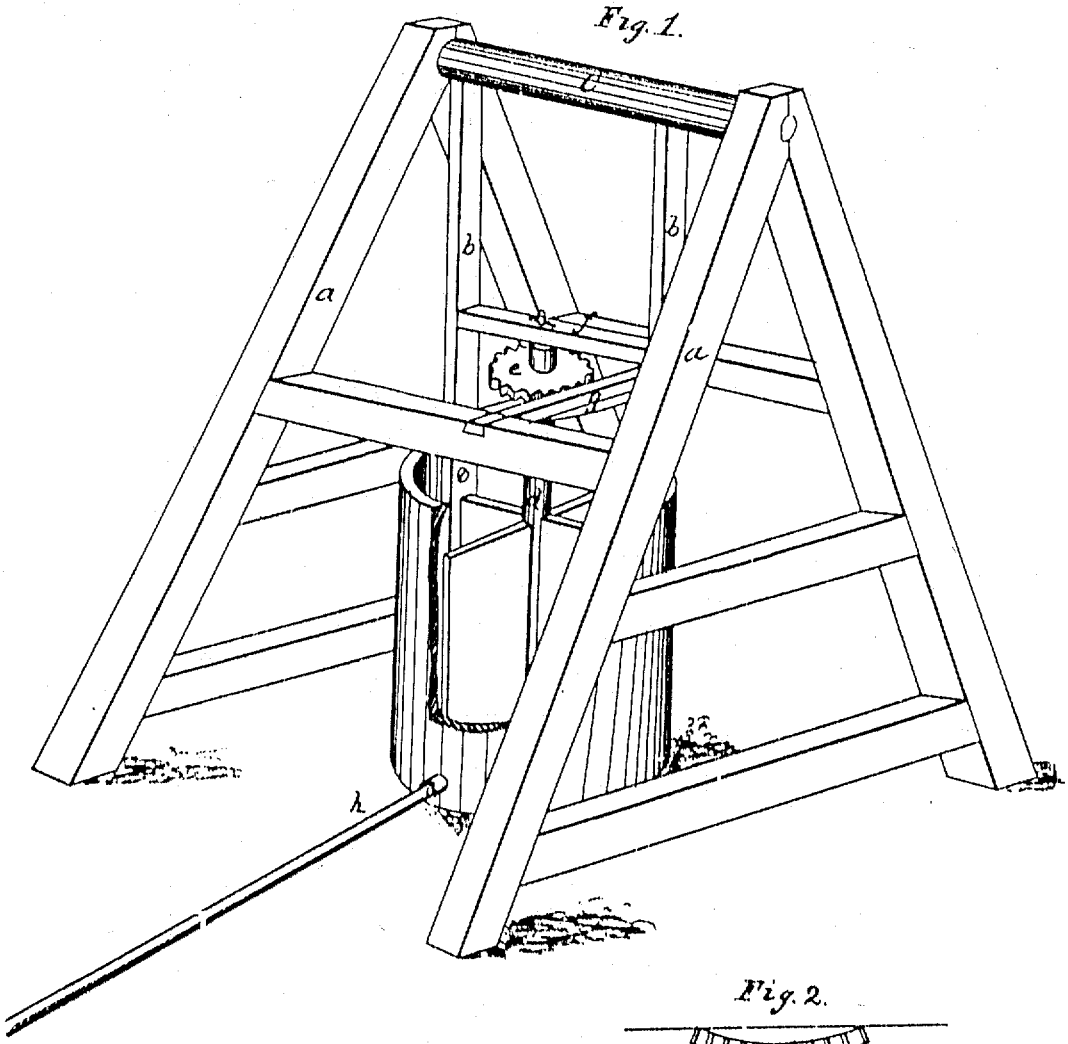
Figure 2:
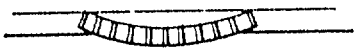

X0009383

L. Whittier.

Churn.

Patented Feb 10. 1836.

N. PETERS, PHOTO-LITHOGRAPHER, WASHINGTON, D. C.

9383X

Feb 10 1836

Lyman Whittier of Vienna Maine

Letters Patent.

The Schedule referred to in these Letters Patent and making part of the same
containing a description in the words of the said Lyman Whittier himself
of his Improvement in the Churn To all to whom these Presents shall come: Be it Known that I Lyman
Whittier of Vienna in the County of Kennebec and State of Maine have inven-
ted a new and useful improvement in the churn and the following is a full and
exact description of the construction and operation of said Churn as invented &
improved by me. First the churn which receives the cream is the ordinary round
churn of such size as may be desired. To this churn a frame is attached as follows
to wit. Two pieces of wood 1/2 by 1/2 inch square, and 4 feet 4 inches long
are united at one end like the letter A (without the cross) Midway of these pieces
a piece of wood 1/2 inch by 2 inches and 3 feet long crosses the two pieces (by
being let in so as to have them even on both sides) which constitutes one side. anoth-
er side is made like unto it and the two sides are united together by 2 pieces of
wood of the size of the other cross pieces at the foot of the pieces (like the letter A)
and also by 2 pieces across from the ends of the cross pieces on the side which makes
the frame to consist of ten pieces. The last named cross pieces which unites the two
sides being 15 inches long, and the pieces on the side being 3 feet long gives an open
space of 3 feet one way (that is between the sides) and fifteen inches from one side
to the other. Within this space the churn is suspended by being attached to two
upright slats 1/2 inch wide 1/2 inch thick. The slats are fastened at the up-
per end to a roller which roller rests on the upper end on top of the sides of
the frame, in such a manner as to permit the roller to turn free and easy.
Within the churn an upright shaft is set on a pivot (in the centre) 2½ feet
long (the churn say - being 22 inches deep) and on this shaft which should
be of convenient size, above the top of the churn is placed a wheel, say 8
inches diameter having 10 or 12 cogs in it (or more or less as may be desired)
The upper end of the shaft is kept in a central position by a cross piece from
one slat to the other into which the top of the shaft enters. A piece of wood
say 3 inches wide 1/2 inch thick and 3 feet long rests on the cross pieces whe- 4.                9383 X                Feb 10, 1836 connect the sides of the frame (in the centre) from the middle of this piece (or centre lengthways) on a circle corresponding to the swing of the churn is set say 25 cogs — which are to match with the cogs on the wheel on the shaft so that when the churn swings like the pendulum of a clock it will give a motion to the shaft once round & back again. At the lower end of the shaft within the Churn are breakers or ladles in such number or size as may be thot necessary to give sufficient motion to the cream. The Churn is swung most conveniently, by a small rod say 4 feet long attached to the bottom of the churn. A Patent is claimed for the manner of producing the motion to the cream by the action of the wheel and cogs.

Exd.        Witnesses
W.G.        J. D. Boswell                Lyman Whittier
        Nath. Whittier Drawing made.

656 [illegible]